United States Patent

Hayashi et al.

[11] Patent Number: 4,727,969
[45] Date of Patent: Mar. 1, 1988

[54] VISCOUS FLUID COUPLING

[75] Inventors: Masaharu Hayashi; Kenji Hattori; Toshiaki Shirai, all of Toyota, Japan

[73] Assignees: Aisin Seiki Kabushiki Kaisha, Kariya; Toyota Jidosha Kabushiki Kaisha, Toyota, both of Japan

[21] Appl. No.: 770,583

[22] Filed: Aug. 29, 1985

[30] Foreign Application Priority Data

Aug. 30, 1984 [JP] Japan .................. 59-182266
Sep. 26, 1984 [JP] Japan .................. 59-201379

[51] Int. Cl.⁴ .................. F16D 35/00; F16D 43/25
[52] U.S. Cl. .................. 192/58 B; 192/82 T
[58] Field of Search .................. 192/58 B, 82 T

[56] References Cited

U.S. PATENT DOCUMENTS

| | | | |
|---|---|---|---|
| 2,516,269 | 7/1950 | Starkey | 192/82 T |
| 4,312,433 | 1/1982 | Bopp | 192/58 B |
| 4,351,425 | 9/1982 | Bopp | 192/58 B |
| 4,444,300 | 4/1984 | Hayashi et al. | 192/58 B |
| 4,467,747 | 8/1984 | Braatz et al. | 192/82 T X |
| 4,467,901 | 8/1984 | Hattori et al. | 192/58 B X |
| 4,579,206 | 4/1986 | Velderman et al. | 192/58 B |

FOREIGN PATENT DOCUMENTS 14249 2/1978 Japan .................. 192/58 B

Primary Examiner—Rodney H. Bonck
Attorney, Agent, or Firm—Oblon, Fisher, Spivak, McClelland & Maier

[57] ABSTRACT

A viscous fluid coupling used as a cooling fan for automobile engines, having a power output member divided into two water chambers by a partition. The refluxing of water between the two chambers are controlled by a valve which opens the first hole of the partition by being associated with a bimetal that operates by detecting the temperature of the air passing through the radiator and opens the second hole of the partition by being associated with a thermostat that operates by detecting the temperature of the water in the water pump, thereby effecting the accurate control of the rotation speed of the fan.

1 Claim, 6 Drawing Figures

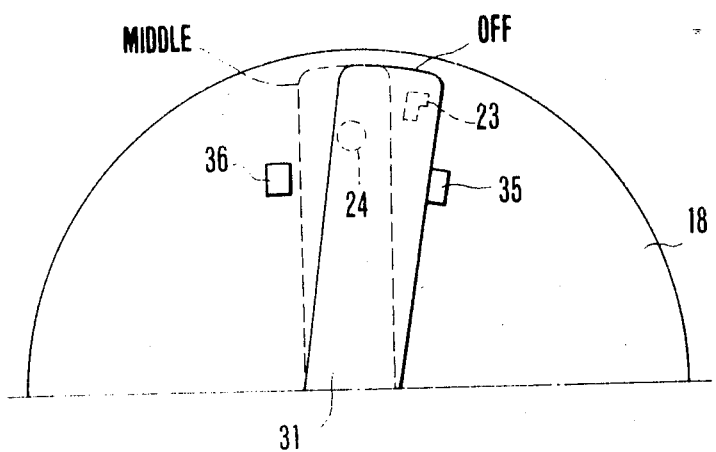

U.S. Patent Mar. 1, 1988 Sheet 4 of 4 4,727,969
FIG. 5 *PRIOR ART*
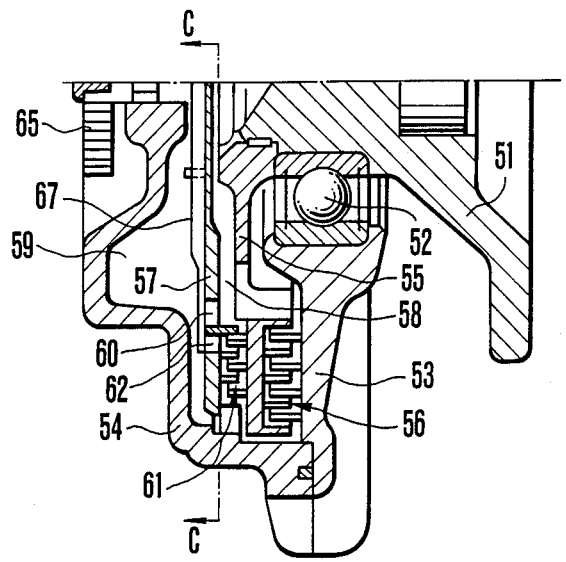
FIG. 6 *PRIOR ART*
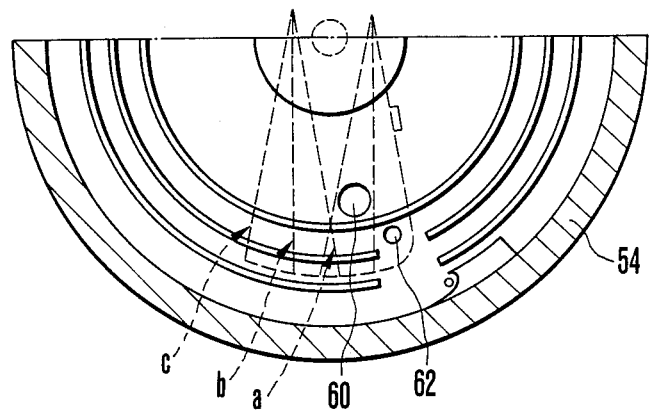

VISCOUS FLUID COUPLING

BACKGROUND OF THE INVENTION

1. Field of the Invention

This invention relates to a viscous fluid coupling, more particularly a temperature sensitive viscous fluid coupling which can control the transmission of the output torque in three steps in accordance with temperature, and can be used as a cooling fan for automobile engines.

2. Description of the Prior Art

A known prior art related to this invention is described in the Japanese Laid-open Patent Publication No. 69326/1980 (Toku-kai-sho No. 55-69326). The device disclosed in the above publication has the structure as illustrated in the attached FIG. 5 and FIG. 6. Casing 53 is supported to be rotatable on rotating shaft 51 driven by an engine through bearing 52. Cover 54 is fixed on casing 53 so as to form internal space together with said casing 53, and rotor 55 is connected to rotating shaft 51. The internal space is separated by partition 57 fixed to cover 54 into working chamber 58 that accommodates rotor 55 and storage chamber 59 that stores viscous fluid. The first torque transmitting surface 56 comprising labyrinth grooves is formed on the opposing surfaces of rotor 55 and casing 53, whereas the second torque transmitting surface 61 comprising labyrinth grooves is formed on the opposing surfaces of rotor 55 and partition 57. The first return hole 62 and second return hole 60 that reflux viscous fluid from storage chamber 59 to working chamber 58 are formed in partition 57 (the first return hole being formed on the outer periphery side in the radial direction and the second return hole on the inner periphery side), spiral bimetal 65 that operates by detecting the temperature of the air that passes through the radiator is mounted on the front of cover 54, and the opening and closing of the both return holes 62 and 60 are controlled by valve plate 67 that is connected to said bimetal 65 and that moves around on partition 57. That is to say, valve plate 67 is held in position a where both return holes 62 and 60 close at low temperature, is held in position b where only the first return hole 62 formed on the outer peripheral side in the radial direction opens when the temperature rises and reaches the first specified temperature T1, and is held in position c where the second return hole formed on the inner periphery side in the radial direction also opens when the temperature rises further and reaches the second specified temperature T2 (where T1<T2), as illustrated in FIG. 6. Since the torque transmission from rotating shaft (input member) 51 to casing 53 and cover 54 (output member) is controlled in three steps in this manner, the rotational speed of the cooling fan installed on the output member is controlled in three steps: i.e. low speed rotation (OFF state) at a low temperature lower than the first specified temperature T1, medium speed rotation (MIDDLE state) at a medium temperature between the first specified temperature T1 and the second specified temperature, and high speed rotation (ON state) at a high temperature higher than the second specified temperature T2.

As mentioned above, the conventional device detects the temperature of the air that passes through the radiator by spiral bimetal to control the rotational speed of the cooling fan installed on the output member in three steps of OFF, MIDDLE and ON. Therefore, sometimes the fan rotates at high speed even when the temperature of the engine-cooling water is low. For instance, when the vehicle is running on urban streets, and the temperature of air passing through the radiator is low with no temperature rise of the water in the engine (namely, the temperature corresponding to the OFF or MIDDLE state), the fan should rotate at a low or middle speed. Nevertheless, under such condition, the fan tends to rotate at a high speed in the "ON" state, because the volume of air passing through the radiator is small, the velocity of the passing air is low, and air blown to the bimetal mounted on the front of the output member is weak.

SUMMARY OF THE INVENTION

The object of the present invention is to provide a viscous fluid coupling which can feed the required volume of cooling air to the engine, accurately corresponding to the heat generated by the engine, avoiding the above drawbacks of the conventional device.

In accordance with the present invention, the valve means for controlling the opening and closing of the first return hole and the second return hole is associated with not only a spiral bimetal which operates by detecting the temperature of the air passing through the radiator but also a thermostat which operates by detecting the temperature of the water in the vortex chamber.

In one embodiment of the present invention, the valve means consists of a single valve plate which controls the opening and closing of the first return hole with an rotating movement on the partition by being associated with the spiral bimetal and controls the opening and closing of the second return hole with a movement in the axial direction by being associated with the thermostat.

When the temperature is lower than the first specified temperature, the first and second return holes disposed on the partition are closed by the valve plate and the fan rotation is maintained in the OFF state. As the temperature rises so as to reach the first specified temperature, the bimetal detects the temperature of the air passing through the radiator, the valve plate interlocked with the bimetal moves around on the partition plate to open the first return hole and maintains the fan rotation in the MIDDLE state. As the temperature further rises to reach the second specified temperature, the thermostat detects the temperature of the water in the vortex chamber of the water pump and the valve plate interlocked with the thermostat moves in the axial direction to open the second return hole, and the fan rotation is maintained in the ON state. Thus the bimetal rotates the valve plate to open and close the first return hole and controls the fan rotation to change it over to the OFF state and MIDDLE state, whereas the thermostat moves the valve plate in the axial direction to open and close the second return hole and controls the fan rotation to change it over to the ON state and MIDDLE state. Sine the thermostat operates by directly sensing the temperature of the cooling water flowing into the vortex chamber of the water pump, there is no possibility of the fan rotation being turned ON by the atmosphere temperature in the engine room. As described above, control of changeover of the fan rotation between the MIDDLE state and ON state is done by directly detecting the temperature of the cooling water in the engine by means of a thermostat, it is possible to feed the required volume of air with high accuracy depending on the heat generated by the engine.

The foregoing and other objects, features and advantages of the present invention will be understood more clearly and fully from the following detailed description of preferred embodiments with reference to the attached drawing.

BRIEF DESCRIPTION OF THE DRAWINGS

FIG. 4 shows a front view of the partition in FIG. 1.

FIG. 5 shows a partial sectional view of the conventional viscous fluid coupling.

FIG. 6 shows a cross-sectional view taken along the line C—C in FIG. 5.

DESCRIPTION OF PREFERRED EMBODIMENTS

Figure 1:
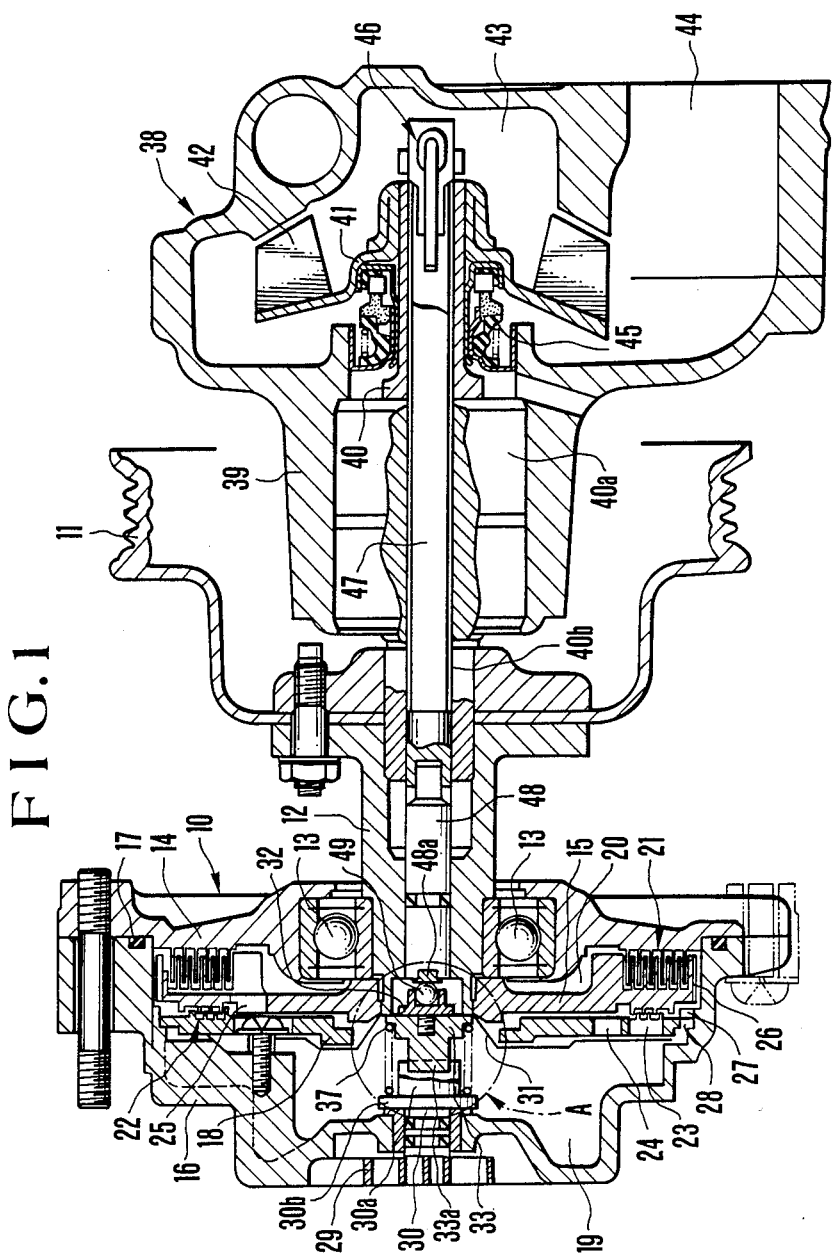
FIG. 1 shows the sectional view of one embodiment of the viscous fluid coupling in accordance with the present invention.

Referring to FIG. 1, viscous fluid coupling 10 shown is provided with rotating shaft 12 as the input member that receives the driving force of the engine through pulley 11, casing 14 is supported freely rotatably on said shaft 12 through bearing 13, and rotor 15 is integrally connected to the left end of shaft 12 shown in the figure. Cover 16 is fixed on casing 14 through O-ring 17 for sealing so as to form internal space, and the internal space between casing 14 and cover 16 is separated into reservoir chamber 19 that reserves viscous fluid and working chamber 20 that accommodates rotor 15. On the opposing surfaces of rotor 15 and casing 14 is formed the first torque transmitting surface 21 comprising the known labyrinth grooves, whereas on the opposing surfaces of rotor 15 and cover 16 is formed the second torque transmitting surface comprising the known labyrinth grooves. On partition 18, the first return hole 23 is formed on the outer periphery side in the radial direction and the second return hole 24 is formed on the inner periphery side as the passageway for refluxing the viscous fluid in reservoir chamber 19 to working chamber 20, and furthermore passageway 25 is formed for rotor 15 so that viscous fluid can be fed to the first torque transmitting surface through said second return hole. Also a pump mechanism is formed by notch 26 formed on the side of the outer periphery of rotor 15, pump projection 27 formed on the outer periphery of partition plate 18, and pump hole 28, and when relative rotation occurs between rotor 15 and partition 18, the viscous fluid in working chamber 20 is fed to reservoir chamber 19 by the action of the aforementioned pump mechanism.

Spiral bimetal 29 that operates by detecting the temperature of the air passing through the radiator is mounted on the front of cover 16. The outer end of said bimetal 29 is fixed to cover 16, whereas the inner end is fixed to rod 30 that is rotatably mounted on cover 16.

Figure 2:
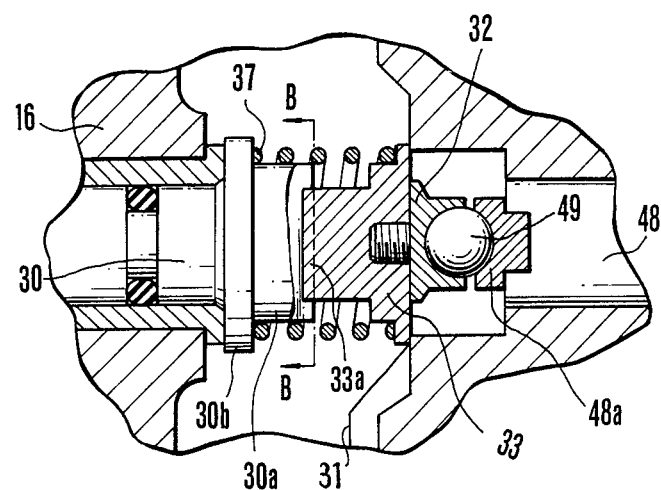
FIG. 2 shows the enlarged view of the portion A in the viscous fluid coupling of FIG. 1.
Figure 3:
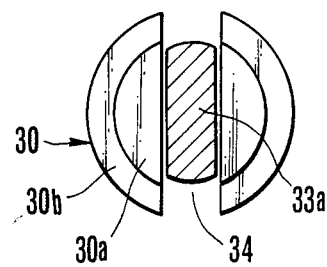
FIG. 3 shows a cross-sectional view taken along the line B—B in FIG. 2.

Valve plate 31 disposed on the side of reservoir chamber 19 of partition plate 18 is sandwiched and fixed between valve shaft 32 and guide member 33 connected to said shaft 32 with a screw at its axial center. As shown in FIG. 2 and FIG. 3, the left projection of said guide member shown in the figure fits into the groove formed in right projection 30a of rod 30 shown in the figure. Thus guide member 33 so so constructed that it is rotated integrally with valve plate 31 by the width-across-flats of guide member projection 33a that fits into groove 34 of rod 30 as rod 30 rotates. That is to say, interlocked with bimetal 29, valve plate 31 moves around on partition plate 18 and controls the opening and closing of the first return hole 23. Of stoppers 35 and 36 shown in FIG. 4, stopper 35 that restricts the rotation of valve plate 31 inhibits the rotation at low temperature and stopper 36 inhibits the rotation at high temperature. Valve plate 31 is forced in the direction of closing the second return hole at all times by spring 37 of which end is fixed to flange 30b of rod 30. Since projection 33a of the width-across-flats of guide member 33 is movable in the axial direction in groove 34 of rod 30, valve plate 31 is shifted in the axial direction by the thermostat to be mentioned later and controls the opening and closing of the second return hole.

Water pump 38 used for circulating the cooling water for the engine has pump body 39 fixed to the stationary section of the engine and rotating shaft 40 which is rotatably disposed in body 39. The rotating shaft 40 is integrally connected to rotating shaft 12 of viscous fluid coupling device 10 and is subject to the driving force of the engine in the same manner. The engine cooling water flowing from the radiator into vortex chamber 43 in body 39 is fed to delivery passageway 44 by impeller 42 of pump rotor 41 fixed on shaft 40. Sealing of cooling water in vortex chamber 43 to the side of drive section 40 of shaft 40 is done by the known mechanical seal 45. Thermostat 46 that operates by detecting the temperature of the cooling water in vortex chamber 43 is installed on the right end of shaft 40 shown in the figure and the first rod 47 interlocked with said thermostat 46 is disposed in through-hole 40b in shaft 40 movably in the axial direction. The second rod 48 connected to the first rod 47 is accommodated in shaft 12 movably in the axial direction and ball 49 accommodated in the aforementioned valve shaft 34 comes into contact with seat member 48a fixed to the left end of said second rod 48 shown in the figure.

Operation of the viscous fluid coupling of FIG. 1 is as follows:

Valve plate 31 is in a position to close the first return hole 23 and second return hole 24 as shown in FIG. 4 when the temperature of the air passing through the radiator is at a low temperature lower than the first specified temperature T1, and the volume of the viscous fluid in working chamber 20 is minimum and the rotation of the fan installed to cover 16 (output member) is maintained at a low speed (OFF state). When the temperature of the air passing through the radiator reaches the first specified temperature T1 as the temperature rises, valve plate 31 interlocked with spiral bimetal 29 that operates by detecting said air temperature opens the first return hole 23 and, as a result, the viscous fluid is fed from storage chamber 19 to the second torque transmitting surface 22 in operating chamber 20 through the first return hole 23 and the fan rotation is maintained at a medium speed (MIDDLE state). When the temperature of the cooling water in vortex chamber 43 of water pump 38 reaches the second specified temperature T2 (where T1<T2) which is higher than the aforementioned first specified temperature T1 as the temperature rises further, thermostat 46 detects said cooling water temperature and elongates in the axial direction to move the first rod 47 shown in the figure in the leftward direction interlocked with said thermostat 46. Thus the second rod 48 connected to the first rod 47 moves in the leftward direction in the same manner as shown in the figure and moves valve plate 33 in the axial direction against the force of spring 37. That is to say, valve plate 33 moves away from the surface of partition 18 to open the second return hole 24 and consequently the viscous fluid is fed also from the reservoir chamber 19 to the first torque transmitting surface 21 through passageway 25 that passes through the second return hole 24 and rotor 15, the fan rotation thereby being maintained at a high speed (ON state).

As is clear from the above description, in the viscous fluid coupling of the present invention, since the temperature of the cooling water for the engine is directly detected to control changeover of the fan rotation from medium to high speed (from MIDDLE to ON state), the required volume of air can be accurately fed depending on the heat generated by the engine. Also the spiral bimetal detects the first specified temperature and the thermostat detects the second specified temperature, so that it is easy to set the first and second specified temperatures and the operational reliability can be improved over the conventional device designed to detect the first and second specified temperatures by spiral bimetal alone.

It should be understood that the preferred embodiment of the present invention has been described herein in considerable detail and that certain modifications, changes, and adaptations may be made therein by those skilled in the art and that it is hereby intended to cover all modifications, changes and adaptations thereof falling within the scope of the appended claims.

What is claimed is:

1. A viscous fluid coupling comprising:
   an input member driven by an engine and having a rotor,
   an output member supported rotatably on said input member,
   a partition fixed to said output member and separating the internal space of said output member into a reservoir chamber for viscous fluid and a working chamber that accommodates said rotor,
   a first return hole and a second return hole which are formed in said partition for refluxing viscous fluid from said reservoir chamber to said working chamber,
   valve means comprising a single valve plate to control the opening and closing of said first and second return holes so that the transmission of torque from said input member to said output member is performed in three stages, and
   said valve means controlling the opening and closing of said first return hole with a rotating movement on the partition by being associated with a spiral bimetal that operates by detecting the temperature of the air passing the radiator; and controlling the opening and closing of said second return hole with a movement in an axial direction of the rotor by being associated with a thermostat that operates by detecting the temperature of the water in a vortex chamber of a water pump.

* * * * *